Patented July 14, 1953

2,645,571

UNITED STATES PATENT OFFICE 2,645,571

INFLAMMABLE COMPOSITION CONTAINING RED PHOSPHORUS

Martin S. Silverstein, Camden, N. J.

No Drawing. Original application January 27, 1944, Serial No. 519,949. Divided and this application March 13, 1945, Serial No. 582,481

2 Claims. (Cl. 52—2)

(Granted under Title 35, U. S. Code (1952), sec. 266)

The invention described herein may be manufactured and used by or for the Government for governmental purposes, without the payment to me of any royalty thereon.

This invention relates to inflammable compositions of matter, such as ammunition primer compositions, including red phosphorus and a solid oxidizing agent for red phosphorus.

It has been proposed to use red phosphorus in small arms primer compositions mixed with such substances as barium nitrate, antimony sulphide and lead peroxide. Such primer compositions have been found to offer the advantages of giving uniform ballistic results as well as being non-corrosive. Red phosphorus is also extensively used for match heads as well as in striking surfaces for matches.

However, when compounded with oxidizing agents, the phosphorus is exposed to increased oxidation effects. During such oxidation there is produced a liquid which is probably an aqueous solution of phosphorus acids and probably, ultimately, phosphoric acid. It is the presence of this liquid which is disadvantageous to the aforementioned uses of red phosphorus in that it renders the phosphorus more difficult to ignite.

The present invention makes use of red phosphorus which has been prepared or treated in accordance with the process claimed in my co-pending application Ser. No. 519,949, filed January 27, 1944. The present application is a division of said application and a continuation-in-part of my co-pending application Ser. No. 410,054 filed September 8, 1941, now abandoned.

The process or method comprises a preliminary period of deliberate oxidation and the removal of the products of this reaction before using the phosphorus.

Analyses of many samples of red phosphorus of commerce from various sources of supply have revealed that all of them contained compounds of iron and compounds of other metals, such as copper. These compounds are present in comparatively small amounts, and their amounts vary. Iron compounds, for example, in red phosphorus sold on the market are present in amounts which roughly vary from 200 to 700 parts of iron (as Fe) per million parts of substantially dry pulverulent red phosphorus. As is well known, red phosphorus appears in commerce as a pulverulent material which, when first prepared or fresh, is a substantially dry powder, but it slowly becomes moist if freely exposed to the atmosphere or if it is kept in a container which is not tightly closed to prevent access of the atmosphere.

When the pulverulent red phosphorus of commerce is treated according to the process of my above mentioned co-pending applications, the resulting substantially dry pulverulent red phosphorus contains very much less of iron than the red phosphorus used as starting materials. The iron compound content (calculated as Fe) of the red phosphorus after treatment according to the process of said applications is reduced to from 5 to 30 parts of iron per million parts of substantially dry pulverulent red phosphorus.

It is due principally to the removal of iron that red phosphorus prepared according to the process of said applications is more resistant to oxidation than red phosphorus sold on the market. The iron compounds, which are removed from the red phosphorus by treatment according to the process of said applications, act to catalyze the oxidation of the red phosphorus if permitted to remain therein, particularly if the red phosphorus is closely associated with a solid oxidizing agent, as is the case of the inflammable primer compositions described herein. The above-mentioned small quantities of metal compounds associated with red phosphorus probably originate from the metallic equipment used in its preparation.

The following examples of the practice of the method or process of said applications, and the preparation of compositions according to the present invention are given below:

Example I

Commercial red phosphorus is placed in porcelain dishes and exposed in a chamber which is maintained at 90% relative humidity and 40° C. for a period of five days after which the material is dispersed in ten times its weight of water for one hour and the red phosphorus is filtered off and washed with water until the washings are no longer acid to litmus paper. The material is then dried in a vacuum oven and is ready for use. The oxidation of the red phosphorus was reduced to 10% of its original value by this preliminary period of oxidation. The iron content of the treated phosphorus was reduced to 17 parts of iron (calculated as Fe) per million parts of dry product.

Example II

The process according to this example is the same as in Example I with the exception that the preliminary oxidation is continued for a period of 19 days instead of for 5 days. In this instance the oxidation of the red phosphorus was reduced to 8% of its original value. The iron content was reduced to 10 parts of iron per million parts of dry product.

Example III

The process according to this example is the same as in Examples I and II except that after the preliminary oxidation, either before or after the washing with water to remove acid, the mass of red phosphorus is subjected to any suitable process to remove particles of red phosphorus less than 10 microns in diameter. Any suitable sedimentation or floating process may be used to accomplish this separation. The product from which the particles of less than 10 microns in diameter have been removed is subjected to filtration, if necessary, and is washed with water to remove acid, if any acid is still present after the said separation of particles. The said acid-free product is then dried in a vacuum oven as in Example I, and is then ready for use. The iron content of the final dry products obtained according to this example was 9 parts of iron per million parts of red phosphorus in the case of the preliminary oxidation period of 5 days; and 5 parts of iron per million parts of red phosphorus in the case of the preliminary oxidation period of 19 days. The substantially dry red phosphorus products obtained according to this example were more resistant to oxidation than the products obtained according to Examples I and II.

Example IV

The preoxidation or partial oxidation of the red phosphorus of commerce is carried out by subjecting it, in pulverulent or finely divided form, to the oxidizing influence of hot water-moist atmospheric air or gaseous oxygen or oxygen enriched air. Air ranging in temperature from about 40° C. to about 90° C. and in relative humidity from about 50 to about 100 per cent may be used. The following procedure has given a final product of very good stability or resistance to oxidation.

Red phosphorus of commerce, in pulverulent form, and of about 200 to 250 parts of iron per million parts of red phosphorus was used as the starting material. This was spread out in layers of about 1½ inch thickness in glass or enamel trays and exposed to an atmosphere of atmospheric air, or a current of atmospheric air, at atmospheric pressure, at 40° C. with a relative humidity of 90 per cent for a period of 15 days. At the end of this oxidation period of 15 days the material was washed free of acids by dispersing it in water, filtering with suction on a Buchner funnel and washing the material in the funnel until the filtrate was no longer acid to litmus paper.

The acid free material was then subjected to a separation procedure to remove substantially all particles of red phosphorus less than 10 microns in diameter. This separation may be accomplished by means of any suitable elutriation, sedimention or flotation procedure. Such procedures are well known in the art of separating or classifying pulverulent solid material and do not require specific description here. The separation may be conducted so as to effect the separation of substantially all of the particles less than 10 microns in diameter or these may be separated for the most part.

After this removal of particles of less than 10 microns in diameter, the material is again suction filtered if it still contains water that can be removed by filtering with suction. The finely divided material consisting of particles of 10 microns and above is then dried in a vacuum oven at 55–60° C. at a pressure of approximately 29 inches of mercury below atmospheric pressure.

The iron content of the final dry product of red phosphorus was lowered by treatment according to this example to 5 parts of iron (calculated as Fe) per million parts of red phosphorus.

Example V

The process according to this example is the same as in Example IV with the exception that the preliminary oxidation is to continue for a period of only 2 days instead of 15 days and particles less than 10 microns in diameter are not removed. In this instance, the oxidation of the red phosphorus was reduced to approximately 30% of its original value. The iron content was reduced to 30 parts of iron per million parts of dry products.

Example VI

The steps of treating the red phosphorus according to this example are the same as Example IV except that the period of preoxidation or partial oxidation is 20 days instead of 15 days. The stability and iron content of the final product are about the same as the final product obtained according to Example IV.

Example VII

The pulverulent red phosphorus prepared according to any of the preceding examples may be formed into inflammable compositions by mixing it with a solid oxidizing agent in finely divided condition. The following oxidizing agents may be used according to the intended use: potassium nitrate, barium nitrate, strontium nitrate, basic lead nitrate, lead peroxide, barium peroxide, and potassium chlorate.

The red phosphorus prepared according to the preceding examples may be used to prepare primers and priming compositions according to U. S. Patent No. 2,194,480 granted March 26, 1940, to C. H. Pritham, E. R. Rechel, and Thomas Stevenson, and to prepare propellant charges according to U. S. Patent No. 2,206,048 granted July 2, 1940, to Ernest R. Rechel and Thomas Stevenson.

Primers prepared according to the above-mentioned patent of Pritham, Rechel, and Stevenson, utilizing red phosphorus prepared according to the preceding examples, are much more stable and resistant to oxidation influences than when red phosphorus found on the market is used. (End of Example VII.)

It is to be noted that the present invention increases the resistance of red phosphorus to oxidation by lowering the iron content thereof to values below the already low values of the iron content of red phosphorus found on the market or in commerce. As pointed out above, this iron content acts as a catalyst to increase or accelerate the oxidation rate. By reducing the iron content to low values, the oxidation rate is depressed or lowered. Utilizing the procedure of Examples V, I, and II, red phosphorus can be produced with iron content not exceeding 30 parts, 17 parts, and 10 parts of iron per million parts of phosphorus respectively, while by the procedure of Examples III and IV red phosphorus can be produced with an iron content not exceeding 9 parts and 5 parts of iron per million parts of phosphorus.

While certain uses of red phosphorus have been enumerated and specific methods of treatments described, it is to be understood that the invention is not intended to be limited thereby, but only within the scope of the appended claims, since other uses and specific methods will be readily apparent to those skilled in the art.

It has also been found that red phosphorus found on the market oxidizes to an undesirable degree even in the absence of added oxidizing agents. The process of the above-mentioned applications is therefore useful regardless of whether the red phosphorus is to be compounded with other agents or used per se.

I claim:

1. An inflammable composition comprising a solid oxidizing agent for red phosphorus and red phosphorus containing not more than thirty parts of iron per million parts of red phosphorus.

2. A primer for ammunition comprising a flame-producing composition including a solid oxidizing agent for red phosphorus, and red phosphorus containing not more than thirty parts of iron per million parts of red phosphorus.

MARTIN S. SILVERSTEIN.

References Cited in the file of this patent

UNITED STATES PATENTS

| Number | Name | Date |
| --- | --- | --- |
| 2,050,796 | Kershbaum et al. | Aug. 11, 1936 |
| 2,194,480 | Pritham | Mar. 26, 1940 |
| 2,359,243 | Pernert | Sept. 26, 1944 |

FOREIGN PATENTS

| Number | Country | Date |
| --- | --- | --- |
| 13,695 | Great Britain | of 1851 |
| 356,809 | Germany | July 31, 1922 |
| 370,379 | Germany | Mar. 3, 1923 |

OTHER REFERENCES

Shalabanov C. A., vol. 26, 1932, page 1729.

Mellor, Inorg. and Theoret. Chem., vol. 8, page 743. (Copy in Div. 59.)